United States Patent [19]
Fischer et al.

[11] Patent Number: 5,239,639
[45] Date of Patent: Aug. 24, 1993

[54] EFFICIENT MEMORY CONTROLLER WITH AN INDEPENDENT CLOCK

[75] Inventors: Stephen A. Fischer; Erez Carmel, both of Sacramento, Calif.; Thomas F. Heil, Easley, S.C.

[73] Assignee: Intel Corporation, Santa Clara, Calif.

[21] Appl. No.: 611,183

[22] Filed: Nov. 9, 1990

[51] Int. Cl.$^5$ ...................... G06F 12/00; G06F 13/00
[52] U.S. Cl. .................... 395/425; 395/550; 364/DIG. 1; 364/238.4; 364/238.3; 364/270.5
[58] Field of Search ........ 395/500, 550, 425; 364/200 MS File, 900 MS File, 270.5, 270.9, 271.6, 238.3, 238.4

[56] References Cited
U.S. PATENT DOCUMENTS

| | | | |
|---|---|---|---|
| Re. 30,331 | 7/1980 | Sorensen et al. | 364/200 |
| 3,668,650 | 6/1972 | Wang | 364/200 |
| 3,809,884 | 5/1974 | Nibby et al. | 364/200 |
| 4,330,824 | 5/1982 | Girard | 364/200 |
| 4,631,666 | 12/1986 | Harris et al. | 364/200 |
| 4,631,667 | 12/1986 | Zulian et al. | 364/200 |

*Primary Examiner*—Alyssa H. Bowler
*Attorney, Agent, or Firm*—Blakely, Sokoloff, Taylor & Zafman

[57] ABSTRACT

A means and a method of interfacing a memory controller with a high speed synchronous CPU wherein the CPU clock is independent of the memory controller clock. The CPU clock is connected to both the CPU and a control interface state tracker located externally to the memory controller. The control interface state tracker is then connected to the memory controller. A separate clock independent from the one used with the CPU is coupled to the memory controller and drives the operation of the memory controller. During the operation of the computer system, the CPU makes read or write cycle requests of the memory controller. Such cycles are initiated when the CPU sends a cycle "start" indicator to the state tracker. In response, the state tracker activates a start strobe to the memory controller to start the actual memory cycle. The memory controller receives the CPU address and cycle status and determines the page hit/miss condition of the memory access. Using this information, the appropriate register in the cycle length register file is accessed to obtain a cycle length feedback value indicating the quantity of wait states necessary for the particular memory cycle. This cycle length feedback value is sent to the external control interface state tracker. The state tracker then returns a ready indication to the CPU after the cycle length time has been satisfied as indicated by the cycle length feedback.

24 Claims, 2 Drawing Sheets

# EFFICIENT MEMORY CONTROLLER WITH AN INDEPENDENT CLOCK

BACKGROUND OF THE INVENTION

1. Field of the Invention

This invention relates to the field of computer architecture. Specifically, the field of the invention is that of memory controllers used by a central processing unit for accessing system memory.

2. Prior Art

An important component in most any computer system is a means for controlling access to system memory. Since system memory holds the data and instructions used by a central processing unit (CPU), control and data transfers occur frequently between the CPU and memory. It is therefore critical to the operation of the computer system that the interface between the CPU and memory be designed in the most efficient manner possible. Many prior art systems employ a memory controller for handling the various requests for memory access made by the CPU. The use of a memory controller has been found to be particularly useful for the control of dynamic random access memory (DRAM). DRAM's require a cyclic refresh signal supplied by the computer system in order to prevent the information stored in DRAM from being destroyed. It is convenient to have a DRAM memory controller handle this refresh task thereby allowing the CPU to be fully dedicated to the task of information processing.

Memory controllers have also been found to be very useful in the prior art for handling memory access requests from the CPU for various size portions of memory. For example, the CPU may request access to a single byte (8 bits) of memory, a word (16 bits), a double word (32 bits), or a burst of data comprising multiple words. For each of these various modes of memory access, the memory controller is responsible for accepting a memory address and various control signals from the CPU, reading or writing the requested data to/from memory and generating the appropriate control signals for the CPU.

Memory controllers also provide an efficient means for handling a variety of different memory configurations without having to modify the CPU or the memory addressing scheme. For example, a particular computer system may configure memory (DRAM) as a single bank of multiple word storage or multiple banks of single word storage. The row and column dimensions of a particular memory configuration may be tailored to optimize the memory access timing for a specific application.

In order to carry out these functions, the operation of the memory controller must be synchronized in some way with the operation of the CPU. In the prior art, two methods are generally used for synchronizing the operation of the memory controller with the operation of the CPU. The first method involves the connection of the CPU clock or a derivative of it to the memory controller as part of the interface for communication between the two devices. With this method, the memory controller is required to operate synchronously with respect to the CPU. Since this method requires synchronous operation between the memory controller and the CPU, the memory controller must be designed for all CPU clock frequencies that it may support. As a result, the memory controller must be modified each time the speed of the CPU is increased even though the speed of memory may not have changed. In addition to the frequent modification of the synchronous memory controller, synchronous operation also has the disadvantage of requiring the CPU clock signal line or lines to be routed over a longer physical distance on the circuit board containing the CPU and the memory controller. As the CPU clock signal gets higher in frequency, clock loading and routing length become more crucial in the control of clock skew and EMI emissions. In a modular design where the memory controller may be on a separate circuit board, the CPU clock signal line or lines will be required to cross the connector between the circuit boards. This configuration can further add to the clock loading and routing length problems.

A second prior art method for synchronizing the operation of the memory controller and the CPU involves separate clocks for the CPU and the memory controller. Thus, since the CPU and the memory controller operate using two separate clock frequencies, the memory controller can operate asynchronously with respect to the CPU. However, these prior art systems require synchronization circuitry at the control signal interface between the memory controller and the CPU. This synchronization circuitry is required to convert from the time domain of one device to the time domain of the other. Thus, when information or control is transferred between the CPU and memory controller, the two independently clocked devices are brought into synchronization for the purposes of the control or information transfer. This prior art method however, produces a performance loss in the operation of the overall system since additional time is required for converting the control signals from the frequency of one time domain to the other.

Thus, an improved memory controller and synchronization technique is needed for overcoming the problems experienced in the prior art.

SUMMARY OF THE INVENTION

The present invention provides a means and a method of interfacing a memory controller with a high speed synchronous CPU wherein the CPU clock is independent of the memory controller clock. A key feature of the present invention is the way in which the interface between the memory controller and the CPU is partitioned. Using this unique partitioning scheme, the CPU clock is connected to both the CPU and a control interface state tracker located externally to the memory controller. The control interface state tracker is then connected to the memory controller. A separate clock independent from the one used with the CPU is coupled to the memory controller and drives the operation of the memory controller. The state tracker is the only logic unit that requires use of the CPU clock. This state tracker is responsible for tracking the CPU bus cycles and returning a "ready" indication back to the CPU after the memory cycle has been completed or accepted. The control interface state tracker is also responsible for generation of the DRAM timing control signals or for triggering another functional logic unit that performs the generation of the timing control signals.

During the operation of the computer system, the CPU makes read or write cycle requests of the memory controller. Such cycles are initiated when the CPU sends a cycle "start" indicator to the state tracker. Once a cycle "start" indicator has been detected from the CPU, the state tracker activates a start strobe (clock) to the memory controller to start the actual memory cycle. The memory controller generates the necessary DRAM timing control signals through use of its own timing elements or integrated delay lines which are independent of the CPU clock. At the same time the DRAM timing control is taking place, the memory controller receives the CPU address and memory cycle status and determines the type and length of the memory access. The type and length of the memory access is determined using the CPU address, memory cycle status, and access status information including the page hit/miss condition of the memory access. Using this information, a cycle length feedback value is obtained from the appropriate register in the cycle length register file. The cycle length feedback value indicates the quantity of wait states necessary to complete the memory cycle. The cycle length feedback is transmitted to the state tracker. The state tracker then returns a ready indication to the CPU after the cycle length time has been satisfied as indicated by the cycle length feedback.

Using the method of the present invention, no performance loss is experienced over the prior art memory controller designs. In addition, since the memory controller of the present invention is independent of the CPU clock speed, the memory subsystem including the memory controller can be more easily modularized by only requiring a modification of the external control interface state tracker if the CPU clock speed or CPU type should change. Thus, the memory accesses performed by the memory controller occur in a time domain that is specifically tuned to the requirements of memory devices and not constrained to the time domain of the CPU. Only the control interface state tracker needs to be built in a technology that is fast enough to keep up with the CPU. It is therefore an object of the present invention to provide a computer system wherein the memory controller is not required to be synchronous with the CPU while at the same time not suffering any performance penalty due to the synchronous decoupling of the memory controller from the CPU.

DETAILED DESCRIPTION OF THE PREFERRED EMBODIMENT

The present invention provides a means and a method of interfacing a memory controller with a high speed synchronous CPU such that the CPU clock is independent of the memory controller clock. In this way, the memory controller can operate asynchronously with respect to the CPU without a performance loss and without the need to frequently modify the memory controller as the speed or type of the CPU changes. Although the term central processing unit or CPU is used in the description of the present invention presented herein, other devices may serve in an equivalent role as that described for the CPU. For example, the means and methods of the present invention may be equivalently used with any device making accesses to a memory. Such devices include a cache controller such as the 82395 or a LAN controller such as the 82596, both of which are manufactured by Intel Corporation, the assignee of the present invention.

In the following description for purposes of explanation and not limitation, specific architectures and protocols are set forth in order to provide a thorough understanding of the present invention. However, it will be apparent to those skilled in the art that the present invention will be practiced in other embodiments that depart from these specific details. In other instances, detailed descriptions of well known aspects of computer architectures and memory systems are omitted so as not to unnecessarily obscure the description of the present invention.

Figure 1:
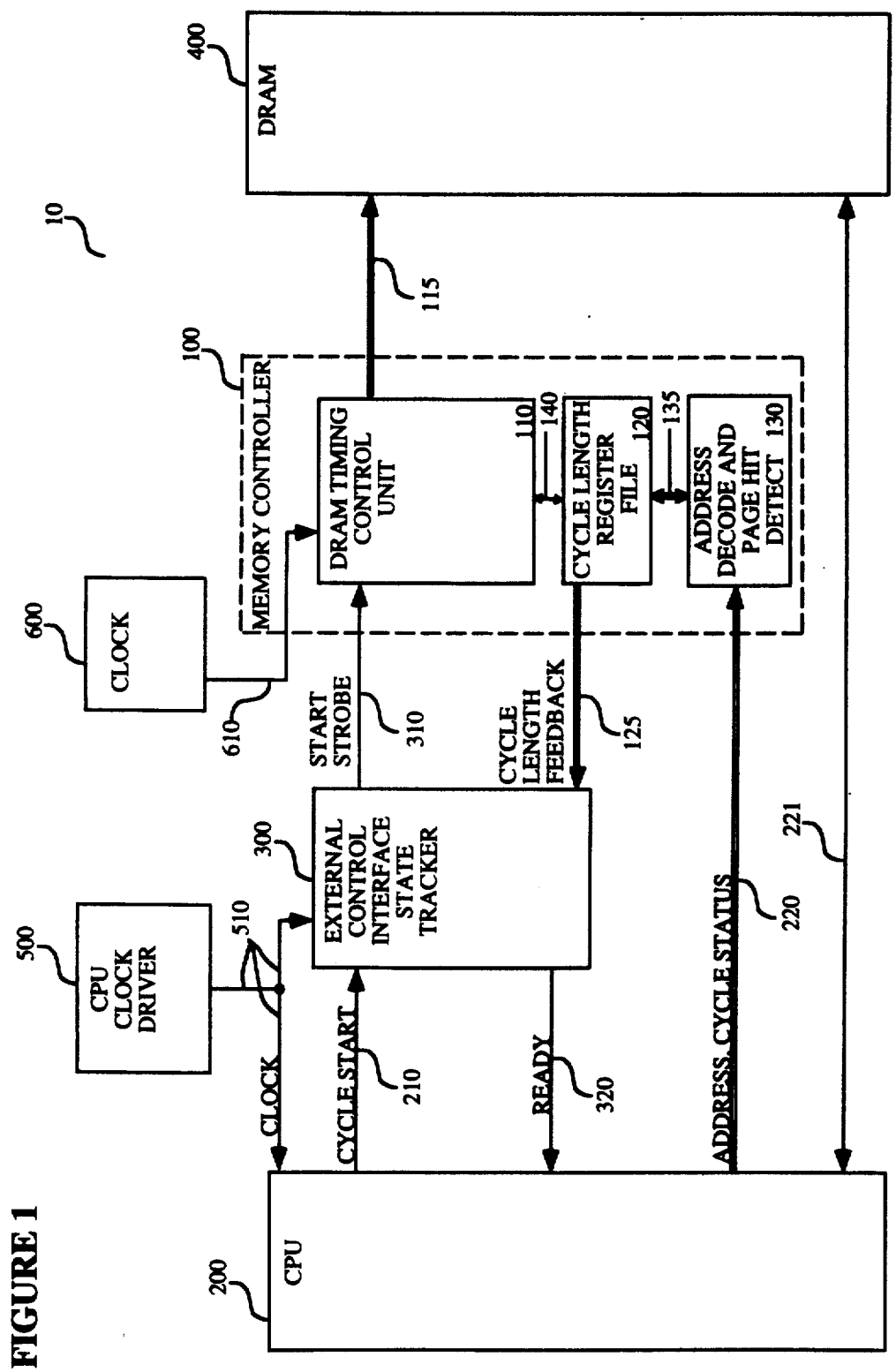
FIG. 1 is a functional block diagram showing the control interface partition between the CPU and the memory controller.

Referring to FIG. 1, a preferred embodiment of the computer system 10 of the present invention. In the preferred embodiment, computer system 10 is shown to include a CPU 200 coupled to an external control interface state tracker 300 coupled to memory controller 100 which is in turn coupled to a dynamic random access memory (DRAM) 400. In addition, a CPU clock driver 500 is included to drive the CPU time domain. Also, clock 600 is included to drive the memory controller time domain.

In the preferred embodiment, CPU 200 is an i486 TM or 386 TM brand microprocessor manufactured by Intel Corporation, the corporate assignee of the present invention. DRAM 400 is a standard dynamic random access memory well known and available to those of ordinary skill in the art. Clock driver 500 is also a standard component well known to those of ordinary skill in the art. In the preferred embodiment, clock driver 500 operates in a 25 to 50 Mhz. range. In the preferred embodiment, clock 600 is typically a 40 Mhz. clock divided by two. The clock driver 500 and clock 600 operate asynchronously to each other.

The present invention utilizes a unique partitioning technique which improves performance and reduces the impact of increasing the clock frequency of the CPU. Part of this partitioning technique involves locating the external control interface state tracker 300 externally to the memory controller 100. The external interface state tracker 300 can then be driven by the same clock 500 that drives the CPU 200. The coupling of clock driver 500 to both CPU 200 and state tracker 300 is illustrated. In the preferred embodiment of the present invention, state tracker 300 is implemented with two programmable logic devices (PLD). After reading the specification of the invention disclosed herein, a means for implementing the present invention using PLDs will become apparent to those skilled in the art. The state tracker 300 monitors CPU bus cycles and initiates read/write memory access cycles when requested by the CPU. Upon request from the CPU, state tracker 300 notifies memory controller 100 of a CPU read/write memory cycle request. The memory controller 100 then informs the state tracker 300 of the number of wait states required in order to carry out the requested memory cycle. With this information from memory controller 100, state tracker 300 is able to generate a ready signal to the CPU at the end of the memory cycle (i.e. after the specified number of wait states have elapsed). This memory access protocol of the present invention is highly efficient and does not cause any synchronization overhead on memory accesses. The details of this memory access protocol during a CPU memory read cycle and a CPU memory write cycle will be described below.

Memory controller 100 provides address and control signals for DRAM based main memory. Main memory 400 may be configured in a variety of ways. In the preferred embodiment, memory 400 utilizes a structure of four rows by four columns. Each of the 16 elements in the 4×4 array is considered a "memory element" of 36 bits (32 bits of data and 4 bits of parity). The maximum of four memory elements in each row allows for a 128-bit wide data line. The four rows, although physically separate, may be logically grouped into two banks of memory having two rows each.

In the preferred embodiment, memory controller 100 maps sequential memory addresses across the rows of DRAM 400 then down the columns. The entire row is connected to the same row address strobe (RAS) used to access the data in that row. Each column is connected to a column address strobe (CAS) used to access data in that column. In a typical memory access, the RAS for a particular row is asserted first followed by the CAS for the particular data item required. The assertion of the RAS requires a precharge time delay to occur prior to the strobing of the row.

Depending on the type of memory access (read or write), the location of the data being serially accessed by the CPU, and the state of the system at the time the memory access request is issued, memory cycles of differing lengths may be encountered. For example, if two consecutive accesses are made to the same row in memory while the RAS is still asserted after the first access, the second access can be performed in less time than the first access; since, it is not necessary to take time to re-assert the RAS for the second access. This type of memory cycle is denoted as a page hit cycle. The page hit cycle is the fastest type of memory access.

In other situations, the second access may be made to a different row than the access made in the first cycle. In this case, the RAS from the first access must first be de-asserted and the row precharge time satisfied before the RAS for the second row may be strobed. This type of memory cycle is denoted as the page miss cycle. This type of cycle results in the longest access time.

In a third situation, a second memory access may be made to a row where the RAS for that row was not left in the asserted state after the first access. In this case, a prior RAS does not need to be de-asserted; however, the new RAS does need to be strobed. Usually in these cases, the row precharge time has been satisfied after the first access. The new RAS can therefore be immediately asserted. These types of memory cycles are denoted as row miss cycles. A row miss cycle is slower than a page hit cycle, but faster than a page miss cycle.

Other types of memory cycles include a read cycle and a write cycle. A read memory cycle may not require the same amount of time as required during a write memory cycle. It is therefore convenient to distinguish between the read and write type of memory cycles.

Memory controller 100 contains many programmable registers which specify the configuration and control of functions within the device such as DRAM timing generation, memory array population, and memory cycle length to name a few. These registers are typically programmed by the execution of the basic input/output system (BIOS) software at power up initialization of the system. One set of these programmable registers is a cycle length register file 120. Cycle length register file 120 contains a plurality of registers for setting the programmable specification of the quantity of clock cycles (or quantity of wait states) required for each deterministic type of memory cycle. Examples of different types of memory cycles include a read or write access, a page hit or page miss cycle, or a row miss cycle. Each of these types of cycles has a deterministic number of clock pulses (or quantity of wait states) necessary to complete the cycle. This programmable cycle length information is stored in the cycle length register file 120 at system initialization.

Memory controller 100 also contains an address decode and page hit detect logic segment 130. Address decode logic 130 receives a 32 bit host address and host cycle status information from CPU 200. Host cycle status information includes a signal having states indicating whether the current memory access is a read or write memory access. Page hit detect logic segment 130 within memory controller 100 generates a page signal having at least three states associated with the address requested and the condition of the DRAM 400 control signals. The page signal is generated by determining whether the address received from CPU 200 is located within a currently asserted row (page hit state) of DRAM 400, located within a row different from the currently asserted row (page miss state), or located within a non-asserted row without a currently asserted row (row miss state). After determining the state of the page signal, memory controller 100 is able access the appropriate cycle length register from the cycle length register file 120 based on the input received by the address decode logic and the state detected by page hit detect logic 130. In addition, based on the address received from CPU 200, the appropriate row address strobe (RAS) and column address strobe (CAS) signals can be generated and sent to DRAM 400 over control lines 115 in order to access the appropriate portion of DRAM. In addition to its task of controlling access to DRAM 400, memory controller 100 is also responsible for generating the appropriate refresh timing for refreshing DRAM 400.

Memory controller 100 operates independently of the host CPU clock 500. This clock independence allows memory controller 100 to be frequency independent of the CPU and thus capable of supporting processors of all frequencies. To facilitate the frequency independence of memory controller 100, a new host bus protocol was devised as part of the present invention. This protocol does not follow the prior art synchronous address strobe (ADS) and ready (RDY) signals generated by the CPU 200. Instead, the memory access protocol of the present invention is asynchronous in nature, since it is not driven by the CPU clock 500. Although the protocol of the present invention is asynchronous, it does not degrade CPU to memory performance like other prior art asynchronous protocols. For CPU to main memory (DRAM 400) cycles, no synchronization penalty is incurred.

The asynchronous protocol of the present invention is used to control deterministic cycle memory accesses made from the CPU to main memory. Since these memory cycles are deterministic, the exact length of each cycle (i.e. the number of clock pulses or wait states necessary to complete the cycle) is predetermined. This cycle length information is programmable and stored in a plurality of registers of the cycle length register file 120. Thus, by receiving the type of memory cycle (read or write) requested by the CPU 200 and by determining the location and state of the access (page hit, page miss, or row miss), memory controller 100 is able to determine at the beginning of the cycle exactly how many wait states will be required for completion of the cycle. Thus, at the beginning of each cycle, memory controller 100 is able to relay the cycle length or wait state information to state tracker 300 via a 3-bit code representing a value associated with the quantity of wait states required for the cycle. Once the state tracker 300 receives information from the memory controller 100 regarding the quantity of wait states required for the memory cycle, the state tracker 300 delays for the specified number of wait states then sends a Ready (RDY) signal 320 to the CPU at the completion of the memory cycle. Thus, the Ready signal 320 is sent to the CPU at the exact moment the memory cycle finishes thereby incurring no synchronization penalty.

Figure 2:
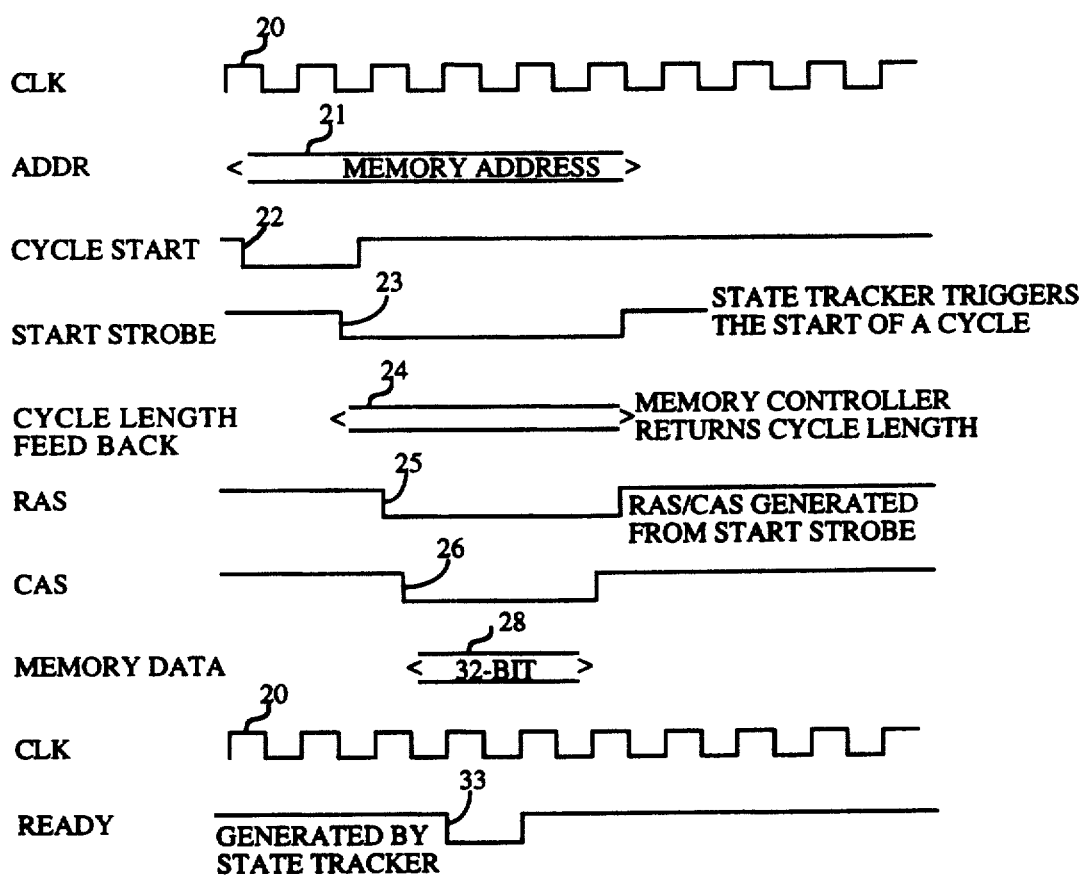
FIG. 2 is a timing diagram showing the interface protocol of the present invention during a memory read or write operation.

Referring now to FIG. 2, a timing diagram of the protocol of the present invention during a CPU memory read or write cycle is illustrated. To begin the memory read example illustrated in FIG. 2, APU 200 initially presents the desired address on address lines 200. A memory cycle status signal indicating whether the requested access is a read or write access (i.e. a read state or write state) is presented at the same time as the address. The active memory address is shown at 21 in FIG. 2. Once the address and status is presented by the CPU 200 on address lines 220, a cycle start signal is sent to state tracker 300 on line 210 shown in FIG. 1. The activation of the cycle start signal is indicated by falling edge 22 in FIG. 2. In response to the cycle start signal, state tracker 300 activates the start strobe signal to memory controller 100 over line 310. The activation of the start strobe signal is indicated by the falling edge 23 in FIG. 2. The activation of the start strobe signal triggers the start of a memory access cycle in the memory controller 100. The activation of the start strobe signal also causes the address and memory cycle status information on address lines 220 to be latched into the address decode and page hit logic 130 of memory controller 100. In the case of a write memory cycle, the data on data lines 221 is also latched at this time using other control lines. Address decode and page hit logic 130 accepts the address and memory cycle status information from line 220 and generates the page signal by determining if the address requested is within a memory row already active or charged (page hit state), determines if the address requested is not within an active or charged memory row (page miss state), and/or determines if the address request is made without another row being active or charged (row miss state). The address decode segment 130 uses the memory cycle status information obtained over line 220 and the page signal to access the appropriate register in cycle length register file 120. Once the appropriate register in cycle length register file 120 is located, the cycle length value therein is obtained. In the preferred embodiment, the cycle length value is a 3-bit value indicating the quantity of cycles or wait states necessary to complete the memory access. The cycle length value (cycle length feedback) is sent from memory controller 100 to state tracker 300 via lines 125. Once state tracker 300 receives the cycle length information from memory controller 100, state tracker 300 can begin counting down or delaying for the cycle length specified from memory controller 100. The transfer of cycle length feedback information from memory controller 100 to state tracker 300 is indicated at 24 in FIG. 2. Concurrently with the transfer of cycle length feedback information from memory controller 100 to state tracker 300, the DRAM timing and control unit 110 of memory controller 100 receives the address latched from address lines 220. The address thus received is used to generate row address strobe (RAS) and column address strobe (CAS) signals for accessing the appropriate portion of DRAM 400. The RAS and CAS signals are transferred to DRAM 400 over lines 115. The activation of the RAS signal is shown in FIG. 2 as the falling edge 25. Similarly, the activation of the CAS signal is shown by falling edge 26 in FIG. 2. Once the row and column have been selected, the data contained at that location is presented on data lines 221 for a read cycle. For a write cycle, the previously latched data is transferred to DRAM 400. Data is presented on data lines 221 or written to DRAM 400 following the expiration of a quantity of cycles corresponding to the cycle length value contained in a register of cycle length register file 120. Thus, after the data has been presented on data lines 221, the state tracker 300 will have completed counting down or delaying for a number of cycles corresponding to the cycle length feedback received from memory controller 100. When this occurs, the Ready signal 33 is transmitted from state tracker 300 to CPU 200 over line 320. As a result of receiving the Ready signal 33 from state tracker 300, CPU 200 latches the data in from data lines 221 for a read cycle on a rising edge of clock 20. Thus, the CPU is able to receive or write data on data lines 221 without the need for memory controller 100 to be driven by the same clock driving CPU 200.

In an alternative embodiment, the function performed by state tracker 300 may be incorporated into the architecture and operation of the CPU 200. In this case, an external control interface state tracker would not be present in the computing device of the present invention. Instead, the cycle start signal transferred on line 210 would be sent directly to memory controller 100 in order to start a memory access cycle. A start strobe signal from the now absent state tracker would not be necessary. In addition, the cycle length feedback information would be transferred from memory controller 100 directly to CPU 200. The CPU 200 would delay for the number of cycles specified by the cycle length feedback value prior to latching the data on data line 221 for a read memory operation.

Thus a means and a method of interfacing a memory controller with a high speed synchronous CPU wherein the CPU clock is independent of the memory controller clock is disclosed.

Although this invention has been shown in relation to a particular embodiment, it should not be considered so limited. Rather, it is limited only by the appended claims.

What is claimed is:

1. In a computing device having a central processing unit (CPU) and memory, a control interface for controlling access to said memory by said CPU comprising:

a) an address decoder for receiving and decoding a memory address from said CPU, said memory address corresponding to a location to be accessed in said memory, said address decoder further includes logic for receiving and decoding a memory cycle status from said CPU, said memory cycle status having a read state indicating that said access to said memory is a read access, said memory cycle status having a write state indicating that said access to said memory is a write access;

b) a storage file for programmably storing said quantity of cycles required to access said location in said memory, said storage file further includes transmission logic for transmitting said quantity of cycles to said CPU, said quantity of cycles being transmitted to said CPU prior to the completion of access to said location in said memory; and c) a memory timing control unit for completing said access to said memory in a number of cycles corresponding to said quantity of cycles transmitted to said CPU, wherein said address deconder further includes logic for generating a page signal, said page signal indicating a page hit state if said address received corresponds to a location within a currently active row of said memory, said page signal indicating a page miss state if said address received corresponds to a location not within a currently active row of said memory, said page signal indicating a row miss state if said address received corresponds to a location without a currently active row of said memory.

2. The control interface as claimed in claim 1 wherein said memory timing control unit further includes logic for receiving a cycle start signal from said CPU, said cycle start signal indicating when said access to said memory should begin.

3. The control interface as claimed in claim 1 wherein said quantity of cycles is based upon said memory cycle status.

4. The control interface as claimed in claim 1 wherein said quantity of cycles is based upon said page signal.

5. The control interface as claimed in claim 1 wherein said storage file includes a cycle length register for storing a value corresponding to said quantity of cycles required for accessing said location in said memory, said storage file retrieving said value from said cycle length register.

6. The control interface as claimed in claim 1 wherein said storage file includes a cycle length register file having a plurality of registers each for storing a value corresponding to said quantity of cycles required for accessing said location in said memory, said storage file retrieving said value from one said cycle length register associated with said memory cycle status.

7. The control interface as claimed in claim 1 wherein said storage file includes a cycle length register file having a plurality of registers each for storing a value corresponding to said quantity of cycles required for accessing said location in said memory, said storage file retrieving said value from one said cycle length register associated with said page signal.

8. The control interface as claimed in claim 1 further includes a state tracker coupled to said CPU, said storage file, and said memory timing control unit, said state tracker having delay logic for delaying a number of cycles corresponding to said quantity of cycles required to access said location in said memory, said state tracker further includes transmission logic for transmitting a ready signal to said CPU, said ready signal being transmitted to said CPU after said delay logic has delayed said quantity of cycles.

9. The control interface as claimed in claim 8 wherein said state tracker further includes logic for receiving a cycle start signal from said CPU, said state tracker further includes logic for transmitting a start strobe to said memory timing control unit, said start strobe triggered by said cycle start signal, said memory timing control unit further includes logic for receiving said start strobe from said state tracker, said cycle start signal and said start strobe indicating when said access to said memory should begin.

10. A computer system comprising:
   a central processing unit (CPU);
   a memory; and
   a control interface coupled between said CPU and said memory, said control interface for controlling access to said memory by said CPU and comprising, a) an address decoder for receiving and decoding a memory address from said CPU, said memory address corresponding to a location to be accessed in said memory, said address decoder further includes logic for receiving and decoding a memory cycle status from said CPU, said memory cycle status having a read state indicating that said access to said memory is a read access, said memory cycle status having a write state indicating that said access to said memory is a write access;

b) a storage file for programmably storing said quantity of cycles required to access said location in said memory, said storage file further includes transmission logic for transmitting said quantity of cycles to said CPU, said quantity of cycles being transmitted to said CPU prior to the completion of access to said location in said memory; and c) a memory timing control unit for completing said access to said memory in a number of cycles corresponding to said quantity of cycles transmitted to said CPU, wherein said address decoder further includes logic for generating a page signal, said page indicating a page hit state if said address received corresponds to a location within a currently active row of said memory, said page signal indicating a page miss state if said address received corresponds to a location not within a currently active row of said memory, said page signal indicating a row miss state if said address received corresponds to a location without a currently active row of said memory.

11. The computer system as claimed in claim 10 wherein said memory timing control unit further includes logic for receiving a cycle start signal from said CPU, said cycle start signal indicating when said access to said memory should begin.

12. The computer system as claimed in claim 10 wherein said quantity of cycles is based upon said memory cycle status.

13. The computer system as claimed in claim 10 wherein said quantity of cycles is based upon said page signal.

14. The computer system as claimed in claim 10 wherein said storage file includes a cycle length register for storing a value corresponding to said quantity of cycles required for accessing said location in said memory, said storage file retrieving said value from said cycle length register.

15. The computer system as claimed in claim 10 wherein said storage file includes a cycle length register file having a plurality of registers each for storing a value corresponding to said quantity of cycles required for accessing said location in said memory, said storage file retrieving said value from one said cycle length register associated with said memory cycle status.

16. The computer system as claimed in claim 10 wherein said storage file includes a cycle length register file having a plurality of registers each for storing a value corresponding to said quantity of cycles required for accessing said location in said memory, said storage file retrieving said value from one said cycle length register associated with said page signal.

17. The computer system as claimed in claim 10 further includes a state tracker coupled to said CPU, said storage file, and said memory timing control unit, said state tracker having delay logic for delaying a number of cycles corresponding to said quantity of cycles required to access said location in said memory, said state tracker further includes transmission logic for transmitting a ready signal to said CPU, said ready signal being transmitted to said CPU after said delay logic has delayed said quantity of cycles.

18. The computer system as claimed in claim 19 wherein said state tracker further includes logic for receiving a cycle start signal from said CPU, said state tracker further includes logic for transmitting a start strobe to said memory timing control unit, said start strobe triggered by said cycle start signal, said memory timing control unit further includes logic for receiving said start strobe from said state tracker, said cycle start signal and said start strobe indicating when said access to said memory should begin.

19. In a computer system having a central processing unit (CPU) and a memory, a process for controlling access to said memory by said CPU comprising the steps of:
   a) programmably storing a quantity of cycles required to access a location in said memory in a storage file;
   b) receiving and decoding a memory address from said CPU, said memory address corresponding to a location to be accessed in said memory;
   c) receiving and decoding a memory cycle status from said CPU, said memory cycle status having a read state indicating that said access to said memory is a read access, said memory cycle status having a write state indicating that said access to said memory is a write access;
   d) retrieving said quantity of cycles from said storage file;
   e) transmitting said quantity of cycles to said CPU, said quantity of cycles being transmitted to said CPU prior to the completion of access to said location in said memory;
   f) completing said access to said memory in a number of cycles corresponding to said quantity of cycles transmitted to said CPU; and
   g) generating a page signal, said page signal indicating a page hit state if said memory address received corresponds to a location within a currently active row of said memory, said page signal indicating a page miss state if said memory address received corresponds to a location not within a currently active row of said memory, said page signal indicating a row miss state if said memory address received corresponds to a location without a currently active row of said memory.

20. The process as claimed in claim 19 further includes a step of receiving a cycle start signal from said CPU, said cycle start signal indicating when said access to said memory should begin.

21. The process as claimed in claim 19 wherein said quantity of cycles is based upon said memory cycle status.

22. The process as claimed in claim 19 wherein said quantity of cycles is based upon said page signal.

23. The process as claimed in claim 19 further includes the steps of:
   a) delaying a number of cycles corresponding to said quantity of cycles required to access said location in said memory; and
   b) transmitting a ready signal to said CPU, said ready signal being transmitted to said CPU after delaying said quantity of cycles.

24. The process as claimed in claim 19 further includes the steps of:
   a) receiving a cycle start signal from said CPU;
   b) transmitting a start strobe to said memory timing control unit, said start strobe triggered by said cycle start signal, said cycle start signal and said start strobe indicating when said access to said memory should begin.

* * * * *

UNITED STATES PATENT AND TRADEMARK OFFICE
CERTIFICATE OF CORRECTION

PATENT NO. : 5,239,639
DATED : August 24, 1993
INVENTOR(S) : Stephen A. Fischer, Erez Carmel and Thomas F. Heil It is certified that error appears in the above-indentified patent and that said Letters Patent is hereby corrected as shown below:

| | | |
|---|---|---|
| Col. 7, Line 19 | Delete "APU" | Insert --CPU-- |
| Col. 7, Line 20 | Delete "200" | Insert --220-- |
| Col. 11, Line 18 | Delete "19" | Insert --17-- |

Signed and Sealed this

Twenty-third Day of May, 1995

Attest:

BRUCE LEHMAN

Attesting Officer

Commissioner of Patents and Trademarks